US010280838B2

(12) United States Patent
Lee

(10) Patent No.: US 10,280,838 B2
(45) Date of Patent: May 7, 2019

(54) ENGINE, BIOMASS POWDER ENERGY CONVERSION AND/OR GENERATION SYSTEM, HYBRID ENGINES INCLUDING THE SAME, AND METHODS OF MAKING AND USING THE SAME

(71) Applicant: Brent Lee, Saratoga, CA (US)

(72) Inventor: Brent Lee, Saratoga, CA (US)

( * ) Notice: Subject to any disclaimer, the term of this patent is extended or adjusted under 35 U.S.C. 154(b) by 250 days.

(21) Appl. No.: 14/508,898

(22) Filed: Oct. 7, 2014

(65) Prior Publication Data

US 2017/0082022 A1 Mar. 23, 2017

Related U.S. Application Data

(60) Provisional application No. 61/967,872, filed on Mar. 28, 2014, provisional application No. 61/995,635, (Continued)

(51) Int. Cl.
*F02C 3/26* (2006.01)
*F02C 3/16* (2006.01)
(Continued)

(52) U.S. Cl.
CPC ............... *F02C 3/26* (2013.01); *F01D 25/30* (2013.01); *F02C 3/04* (2013.01); *F02C 3/165* (2013.01);
(Continued)

(58) Field of Classification Search
CPC .... F02C 3/26; F02C 7/264; F02C 7/04; F02C 3/04; F02C 7/222; F02C 3/165;
(Continued)

(56) References Cited

U.S. PATENT DOCUMENTS

| 684,743 A | * | 10/1901 | Burger | .................. F02C 5/04 60/39.34 |
| 2,444,742 A | * | 7/1948 | Lutjen | .................. F02C 3/16 60/39.15 |

(Continued)

FOREIGN PATENT DOCUMENTS

WO 2014018416 A1 1/2014

OTHER PUBLICATIONS

PCT International Search Report and Written Opinion; PCT International Searching Authority/US dated Aug. 14, 2015; International Application No. PCT/US2015/022843; 12 pages; International Searching Authority/United States, Commissioner for Patents, Alexandria, Virginia.

*Primary Examiner* — J. Todd Newton
(74) *Attorney, Agent, or Firm* — Andrew D. Fortney; Central California IP Group, P.C.

(57) ABSTRACT

An engine, a biomass powder energy conversion and/or generation system, hybrid turbine engines, and methods of manufacturing and using the same are disclosed. The engine includes a housing having an inner wall and an outer wall, a central rotary shaft extending from the housing, at least one fuel and air supply channel having a first portion extending radially from the rotary shaft and a second portion in fluidic communication with first portion of the fuel and air supply channel, at least two propulsion vessels, each propulsion vessel connected to the at least one of the fuel and air supply channel and configured to burn or detonate the fuel and rotate around the central rotary shaft; and at least one exhaust duct extending from the housing.

20 Claims, 10 Drawing Sheets

Related U.S. Application Data filed on Apr. 16, 2014, provisional application No. 61/995,842, filed on Apr. 22, 2014.

(51) Int. Cl.

| | | |
|---|---|---|
| *F02C 3/04* | (2006.01) | |
| *F01D 25/30* | (2006.01) | |
| *F02C 7/04* | (2006.01) | |
| *F02C 7/22* | (2006.01) | |
| *F02C 7/264* | (2006.01) | |
| *F02K 3/062* | (2006.01) | |

(52) U.S. Cl.
CPC ............... *F02C 7/04* (2013.01); *F02C 7/222* (2013.01); *F02C 7/264* (2013.01); *F02K 3/062* (2013.01); *F05D 2210/13* (2013.01); *F05D 2220/30* (2013.01); *F05D 2220/75* (2013.01); *F05D 2240/35* (2013.01); *Y02T 50/671* (2013.01)

(58) Field of Classification Search
CPC .. F02K 3/062; F05D 2220/30; F05D 2210/13; F05D 2240/35; F05D 2220/75
USPC .................................................. 60/772, 200.1
See application file for complete search history.

(56) References Cited

U.S. PATENT DOCUMENTS

| | | | | |
|---|---|---|---|---|
| 2,465,856 A * | 3/1949 | Emigh | .............. | F02K 7/005 416/22 |
| 2,474,685 A * | 6/1949 | McCollum | .............. | B64C 11/00 416/21 |
| 2,509,359 A * | 5/1950 | Margolis | .............. | F02K 7/005 416/20 R |
| 2,551,111 A * | 5/1951 | Goddard | .............. | F02C 3/165 416/171 |
| 2,603,947 A * | 7/1952 | Howard | .............. | F02C 3/165 248/114 |
| 2,625,791 A | 1/1953 | Yellott | | |
| 2,660,859 A * | 12/1953 | Chamberlain | .......... | F02K 7/005 416/21 |
| 2,709,889 A * | 6/1955 | Mount | .............. | F02C 3/165 60/201 |
| 2,709,895 A * | 6/1955 | Mount | .............. | F01D 1/34 60/39.182 |
| 2,890,570 A * | 6/1959 | Castles, Jr. | .............. | F02C 3/16 60/39.35 |
| 3,059,428 A | 10/1962 | Galonska | | |
| 3,059,910 A | 10/1962 | Moriya | | |
| 3,085,399 A * | 4/1963 | Kitchens | .............. | F02K 7/005 60/39.35 |
| 3,145,533 A * | 8/1964 | Ollinger | .............. | F02B 53/00 60/39.34 |
| 3,200,588 A * | 8/1965 | Math | .............. | F02K 7/005 60/39.34 |
| 3,541,787 A * | 11/1970 | Romoli | .............. | F01C 1/063 60/39.34 |
| 3,712,060 A * | 1/1973 | Sorrenti | .............. | F02K 7/005 418/188 |
| 3,716,989 A * | 2/1973 | Moreira | .............. | F01C 1/3566 123/229 |
| 4,208,590 A * | 6/1980 | Blomquist | .............. | F01D 15/10 290/1 R |
| 4,229,938 A * | 10/1980 | Gallagher | .............. | F02C 5/04 60/39.34 |
| 4,302,683 A * | 11/1981 | Burton | .............. | F02C 3/165 290/4 R |
| 4,463,551 A * | 8/1984 | Morris | .............. | F01D 1/32 60/39.35 |
| 4,577,460 A * | 3/1986 | Wirsching | .............. | F02C 3/165 415/909 |
| 4,590,761 A * | 5/1986 | Zettner | .............. | F01C 11/008 123/248 |
| 4,625,509 A * | 12/1986 | Sheppard, Sr. | ......... | F02C 3/165 60/265 |
| 5,282,356 A * | 2/1994 | Abell | .............. | F02C 3/165 416/21 |
| 5,408,824 A * | 4/1995 | Schlote | .............. | F01D 1/32 416/21 |
| 5,636,509 A | 6/1997 | Abell | | |
| 5,660,038 A * | 8/1997 | Stone | .............. | F01D 1/32 60/39.35 |
| 6,295,802 B1 * | 10/2001 | Lior | .............. | F02C 3/165 60/39.35 |
| 7,708,522 B2 * | 5/2010 | Schlote | .............. | F01D 1/22 239/127.1 |
| 7,789,077 B2 * | 9/2010 | Igarashi | .............. | F01M 13/04 123/195 H |
| 7,866,937 B2 * | 1/2011 | Schlote | .............. | F04D 1/00 415/1 |
| 8,117,824 B1 * | 2/2012 | Adams | .............. | F01D 1/32 204/157.15 |
| 8,333,060 B2 * | 12/2012 | Witteveen | .............. | F02C 3/16 60/39.34 |
| 8,776,493 B1 * | 7/2014 | Dawson | .............. | F01D 1/32 123/200 |
| 9,109,535 B2 * | 8/2015 | Khong | .............. | F01D 1/32 |
| 9,291,095 B2 * | 3/2016 | Koch | .............. | F02B 53/00 |
| 2003/0033808 A1 * | 2/2003 | Schlote | .............. | F01D 1/32 60/772 |
| 2004/0000145 A1 * | 1/2004 | Leyva | .............. | F02C 3/165 60/772 |
| 2004/0025509 A1 | 2/2004 | Lawlor et al. | | |
| 2005/0120719 A1 | 6/2005 | Olsen | | |
| 2005/0241315 A1 | 11/2005 | Schlote | | |
| 2010/0269514 A1 | 10/2010 | Fullton | | |
| 2014/0338358 A1 | 11/2014 | Lee | | |

* cited by examiner

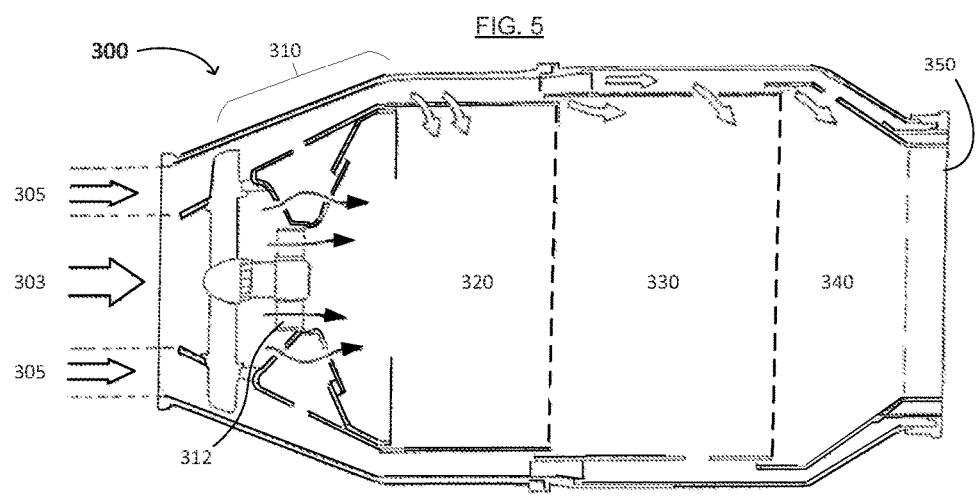
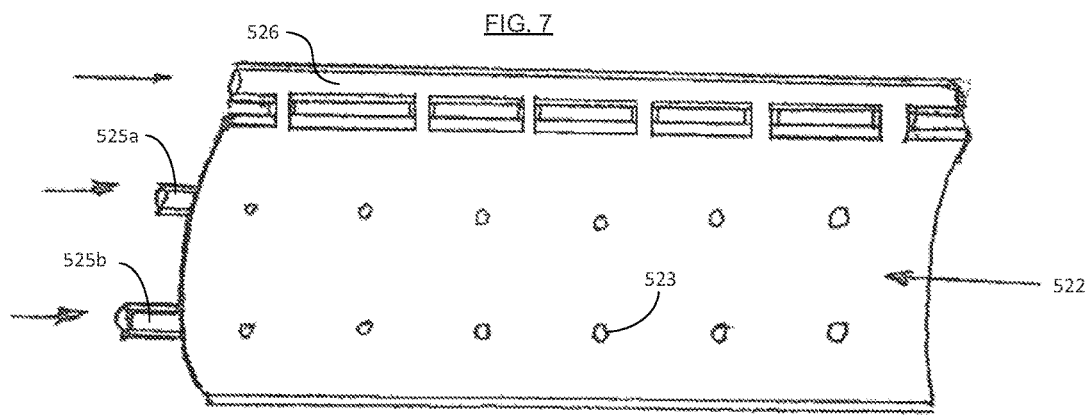

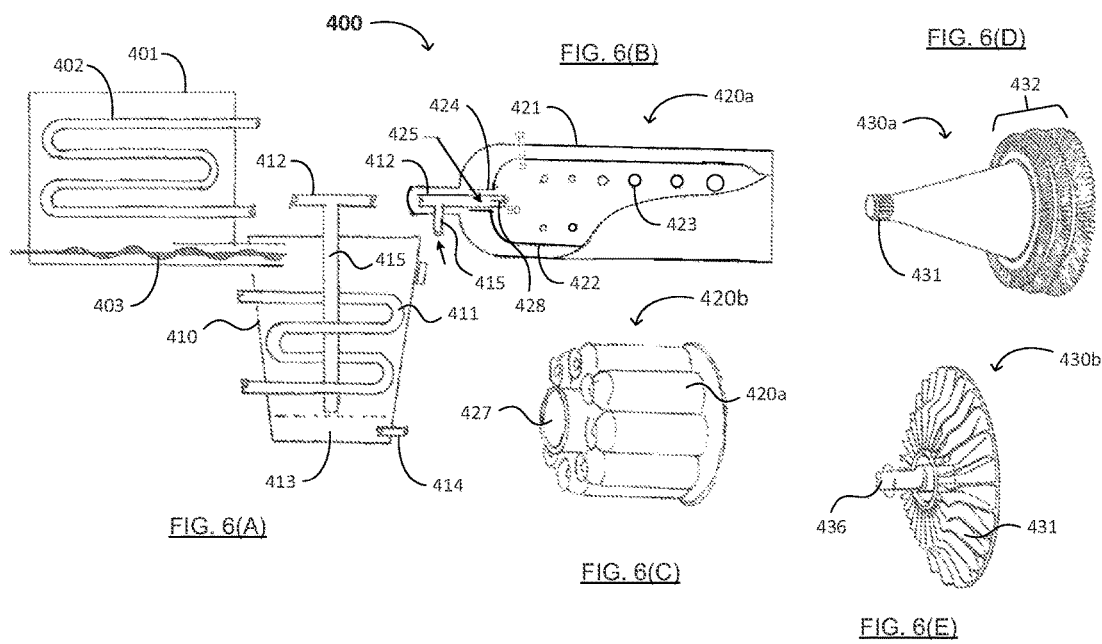

ENGINE, BIOMASS POWDER ENERGY CONVERSION AND/OR GENERATION SYSTEM, HYBRID ENGINES INCLUDING THE SAME, AND METHODS OF MAKING AND USING THE SAME

CROSS REFERENCE TO RELATED APPLICATION

This application claims the benefit of U.S. Provisional Patent Application No. 61/967,872, filed on Mar. 28, 2014, 61/995,635, filed on Apr. 16, 2014, and 61/995,842, filed on Apr. 22, 2014, each of which is incorporated herein by reference as if fully set forth herein.

FIELD OF THE INVENTION

The present invention generally relates to the field of mechanical energy generation. More specifically, embodiments of the present invention pertain to a novel engine, a biomass powder energy conversion and/or generation system, hybrid engines including the same (e.g., hybrid turbine engines), and methods of manufacturing and using the same.

DISCUSSION OF THE BACKGROUND

Recently, developing alternative fuels to decrease the dependence of fossil fuel has become a national and worldwide concern. Existing technology that transforms biomass material for energy typically results in a liquid or a gaseous fuel, and is generally obtained through complex and expensive processes. As a result, there is a need to provide more efficient ways of burning biomass powders and/or fuels, particularly those that burn such powders or fuels directly.

In addition, turbine engines have been used to propel vehicles (e.g., jets) and to produce industrial electrical power and central power generation. Typically, a turbine engine consists of a compressor, a combustor, and a turbine in a sequential arrangement. Influent air is compressed to a high-pressure in the compressor and is fed at a high speed and pressure into the combustor, where the air is mixed with a fuel and is combusted to produce a hot, pressurized stream of gas that is passed into the turbine section where the gas expands and drives a turbine. The turbine converts the energy (e.g., enthalpy) of the gas into mechanical work used to drive the compressor and optionally other devices coupled to the gas turbine.

FIG. 1A shows a conventional gas turbine engine 10, which is typically used in power generation. The gas turbine 10 of FIG. 1A includes a compressor section 14 (which may have multiple stages) for increasing the pressure and temperature of influent air (e.g., at air intake 12); a combustion section or chamber 16 having multiple combustion chambers located around the perimeter of the engine, in which fuel is ignited to further increase the temperature and pressure of the influent air; and a turbine section 18 in which the hot, pressurized air or exhaust 20 is delivered to drive the rotors of the turbine and generate mechanical energy to spin the central axle of the turbine and generate power.

Just about all conventional jet engines and most rocket engines operate on the deflagration of fuel, that is, the rapid but subsonic combustion of fuel. The combustion of fuel in the combustion chamber of conventional gas turbine and turbofan engines exerts force on the turbine blades and creates mechanical power. In such engines, the combustion chamber is an open system and the combustion of fuel is continual. The ignition sources in the combustion chamber (igniters) fire when the engine is started, but is then shut off because fuel and pressurized air from the compressor are constantly fed into the combustion chamber(s) while the engine is running, and ignition of the fuel is thereby sustained.

Although recent technology advancements have enabled the use of smaller, lighter gas turbines that are more efficient and less polluting than other engines types (e.g., combustion engines), the efficiency of gas turbines can be improved. For example, conventional natural gas-fired turbine generators convert only between 25 and 35 percent of the natural gas heating value to useable electricity. In addition, conventional engines carry a heavy load of fuel and oxidizers. Furthermore, conventional engines general require specific types of fuel. Therefore, the need exists for more efficient turbine technologies for propelling vehicles and producing energy and/or electricity.

FIG. 1B shows a conventional rocket engine 30, including fins 32, a nose cone 35, a payload or payload system 40, and guidance system 45, a fuel tank 50, an oxidizer tank 60, pumps 65 feeding fuel and oxidizer from the fuel tank 50 and oxidizer tank 60, respectively, and a combustion chamber 70 with a nozzle 75. Combustion of the fuel using the oxidizer in the combustion chamber 70 creates thrust for moving the payload (e.g., in the payload system/storage area 40) a long distance. However, fuel and oxidizer must be stored in the rocket housing, and the weight of the fuel and oxidizer necessitates more fuel and oxidizer (e.g., to move the fuel and oxidizer), and decreases the efficiency of the engine.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to a novel engine, a biomass powder energy conversion and/or generation system, novel hybrid turbine engines of the same, and methods of manufacturing and using the same. The present invention provides an engine that advantageously uses a rotational driving force as a motor. As a result, the present engine may be more efficient and may have less wear and tear, and/or fewer parts subject to such wear and tear. Furthermore, the present engine can advantageously utilize alternative forms of fuel, such as biomass powder. The biomass powder energy conversion and/or generation system and the hybrid turbine technology of the present invention can be adapted for use in other applications, such as the production of electricity or mechanical drive systems.

In one aspect, the present invention relates to an engine that includes a housing having an inner wall and an outer wall, a central rotary shaft extending from the housing, at least one fuel and air supply channel having a first portion extending radially from the rotary shaft and a second portion in fluidic communication with the first portion, at least two propulsion vessels, each propulsion vessel configured to receive fuel and air from the fuel and air supply channel, burn or detonate the fuel, and rotate around the central rotary shaft, and at least one exhaust duct extending from the housing. Typically, the fuel and air supply channel(s) have a plurality of first portions, wherein adjacent first portions are spaced from each other at equal angles.

In various embodiments of the present invention, the housing may be insulated by an insulation layer that surrounds the outer wall of the housing. The inner wall of the housing may include a plurality of openings to provide optimum air flow. In some embodiments of the present invention, the engine may include a generator that receives rotational force or mechanical energy from the central rotary shaft.

In various embodiments of the present invention, the fuel and air supply channel may have a single conduit or path for the fuel and air supply. Alternatively, the fuel and air supply channel has at least two conduits or paths for fuel and air supply. When the fuel and air supply channel has two conduits or paths, one conduit or path may be for the fuel supply and another conduit or path may be for the air supply. In some embodiments, each propulsion vessel has an igniter that is downstream from the fuel and air supply channel outlet.

Another aspect of the present invention involves a hybrid turbine engine that includes the exemplary engine described herein. In addition, the hybrid turbine engine may have a compressor, and one or more turbine fans rotatably fixed to the shaft, upstream and/or downstream from the engine. Furthermore, the compressor may have one or more rotary fans that are rotatably fixed to the shaft, upstream from the housing.

A further aspect of the present invention related to a biomass powder energy conversion and/or generation system that has a storage tank configured to store the biomass powder, the storage tank having an air conduit therein and a rotary dispensing device configured to transfer the biomass powder from a collection area of the storage tank. The air conduit has a plurality of holes therein. The biomass powder energy conversion and/or generation system further comprises a dispenser and at least one housing with a plurality of rotating propulsion vessels. The dispenser is configured to receive the biomass powder from the storage tank and disperse the biomass powder in the air. For example, the dispenser may have an aspirator configured to provide a suspension of the biomass powder in the air to a fuel supply conduit, which may carry the suspension to the housing. The propulsion vessels are configured to receive the biomass powder suspension from the fuel supply conduit.

In various embodiments of the biomass powder energy conversion and/or generation system, the biomass powder energy conversion and/or generation system has at least one fan downstream from the housing. In addition, the storage tank may have a sensor configured to detect the level or amount of biomass powder in the storage tank. In some embodiments of the present invention, the rotary dispensing device may include an auger. In addition, the dispenser may have one or more heating coils passing or running therethrough configured to heat and dry the biomass powder. Furthermore, the dispenser may have a fluidizer at the bottom thereof.

In further or other embodiments of the present biomass powder energy conversion and/or generation system, the air conduit may have a first section that passes through a wall of the storage tank to supply air to the biomass powder in the storage tank through the holes. In addition, the air conduit may have a u-shaped or s-shaped section inside the storage tank that a plurality of holes or openings. Furthermore, the air conduit may have a third section that passes through the same wall or a different wall of the storage tank that carries excess air out of the storage tank. In some embodiments of the present biomass powder energy conversion and/or generation system, the housing may include walls, a fuel nozzle, an igniter, and an exhaust duct. The system may also have an electrically charged electrode in the fuel nozzle.

A further aspect of the present invention, the hybrid turbine engine may include the biomass powder energy conversion and/or generation system discussed above, a compressor, and one or more turbine fans rotatably fixed to the shaft downstream from the engine. The compressor may include one or more rotary fans rotatably fixed to the shaft upstream from the housing.

Another aspect of the present invention relates to a method of converting energy that includes introducing a fuel into a housing (e.g., for a combustion and/or detonation chamber) through at least a first opening in a fuel and air supply channel radially extending from a central rotary shaft, igniting or detonating the fuel in the combustion and/or detonation chamber, rotating the central rotary shaft, and exhausting combustion and/or detonation gas(es) through at least one opening in an inner wall of the housing and at least one exhaust vent or port in an outer wall of the housing. In various embodiments, the method of converting energy may include directing exhaust from the at least one exhaust vent or port to a turbo unit. The method may also include supplying compressed air to the housing. Furthermore, the method may further include rotating at least one fan in at least one turbine, and compressing the air before the air is supplied to the housing.

A further aspect of the present invention relates to a method of converting biomass powder to mechanical energy that includes introducing the biomass powder into a dispenser from a storage tank using a rotary dispensing device, dispersing or suspending the biomass powder in air using a dispenser, drawing a suspension of the biomass powder in air into an aspirator, supplying the suspension of biomass powder and air from the aspirator to a housing having an inner wall and an outer wall, burning the biomass powder in at least one propulsion vessel (or burner) in the housing, and exhausting gases through an exhaust duct in the outer wall to at least one turbine fan. The propulsion vessel(s) is/are connected to a central rotary shaft in the housing.

Various embodiments of the present method further include heating the biomass powder in the dispenser to remove moisture from the biomass powder. In some embodiments of the present methods, the inner wall of the housing (e.g., for the combustion chamber) may include openings that enable generation of cross flow, reverse flow and/or cyclone flow that separately create turbulence inside the housing. In one example, the method also includes cooling the inner wall by passing external air between the inner wall and the outer wall. Further or other embodiments of the present method may further include ionizing the powder by passing the powder by an electrified pin in a supply channel between the aspirator and the housing (e.g., the combustion and/or detonation chamber).

The present invention may improve the performance of existing engines by using a rotational driving force from a radial arrangement of one or more combustion chambers as a motor. The novel hybrid turbine engine may have improved efficiency, and thus reduced fuel consumption and/or greater power generation in comparison to existing turbine technologies.

In addition, the novel engines may be more efficient than conventional engines, in that the present engines may supply fuel and an oxidizer through one or more channels along the central axis shaft. The present engines may also be more versatile in the types of fuel that drive the motor. The present technology can be used with a number of fuel sources, including natural gas, syngas, coal-derived $H_2$, petroleum fuel products (e.g., gasoline, kerosene, jet fuel, diesel fuel, etc.), ammonium nitrate, nitrous oxide, nitromethane, ethanol, bio-fuels (e.g., a biomass powder, such as sawdust or wood powder), and other fuels. In some aspects, the material that is burned or detonated in the present engines includes biomass powder. Generally, biomass powder includes a wide variety of substances, such as farm agricultural residue (e.g., rice and wheat straws, corn stalks, husks, cobs and silk, and various crop residue), forest products (e.g., hardwood and softwood residues [e.g., dust or powder] from milling and woodworking), and grasses (e.g., pampas and prairie grass). Other forms of biomass powder may include food products, animal waste, organic waste, and unrecyclable plastic materials. The present biomass powder energy conversation and/or generation system advantageously provides development of dry biomass powder to fuel engines for commercial and industrial applications, produces cleaner air by reducing carbon dioxide impact to the environment, provides lower processing cost, easy transportation, storage of powder material, and the availability.

The present turbine engine can be adapted to power generation or other mechanical drive applications (e.g., ground vehicles). For instance, the present invention advantageously provides a hybrid turbine engine that can be used in conventional electrical power generation. The spinning shaft of the turbine can be used to drive an electricity generator. Thus, the novel turbine can be integrated into conventional electricity power generation systems without special design changes or excessive cost. Additionally, the novel hybrid turbine can be manufactured using similar materials and parts used in conventional turbines, and thus the cost of manufacturing may be substantially the same as that of conventional turbines.

Relative to a conventional rocket engine, the present engine and method(s) is advantageously simpler and easier to manufacture and repair, as the payload can be absent, the fuel and oxidizer tanks can be located outside of the same housing that includes the combustion chamber (which may also improve the safety of the present invention), and the efficiency can be greatly improved. For example, with less weight in the housing containing the combustion/detonation chamber, frictional forces can be reduced, and the atmosphere inside the engine can be made less dense, further reducing rotational resistance in the present engine. As a result, the present engine and method(s) can contribute a relatively high proportion of the thrust towards rotational torque. These and other advantages of the present invention will become readily apparent from the detailed description of preferred embodiments below.

BRIEF DESCRIPTION OF THE DRAWINGS

FIG. 5 is diagram showing an exemplary combustion chamber according to the present invention.

FIGS. 6A-E are diagrams showing an exemplary biomass powder energy generation system according to the present invention.

FIG. 7 is diagram showing an exemplary combustion and/or detonation chamber air supply of the biomass powder energy generation system according to the present invention.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and materials have not been described in detail so as not to unnecessarily obscure aspects of the present invention.

Thus, the technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise. Each characteristic is generally only an embodiment of the invention disclosed herein.

Embodiments of the present invention relate to an engine, a biomass powder energy conversion and/or generation system, hybrid turbine engines, and methods of making and using the same. The present engine advantageously has fuel and air supply channels radially extending from a central shaft and/or axis, and propulsion vessels at the ends of the fuel and air supply channels, thereby providing rotational driving force as a motor. In addition, the present engine can efficiently convert a biomass powder to energy. As a result, the present engines and systems are advantageously easier to manufacture and maintain than conventional engines and systems, can use a very low-cost and plentiful renewable ("green") fuel source, and burn or detonate the fuel source in an efficient manner.

An Exemplary Engine

Figure 1A:
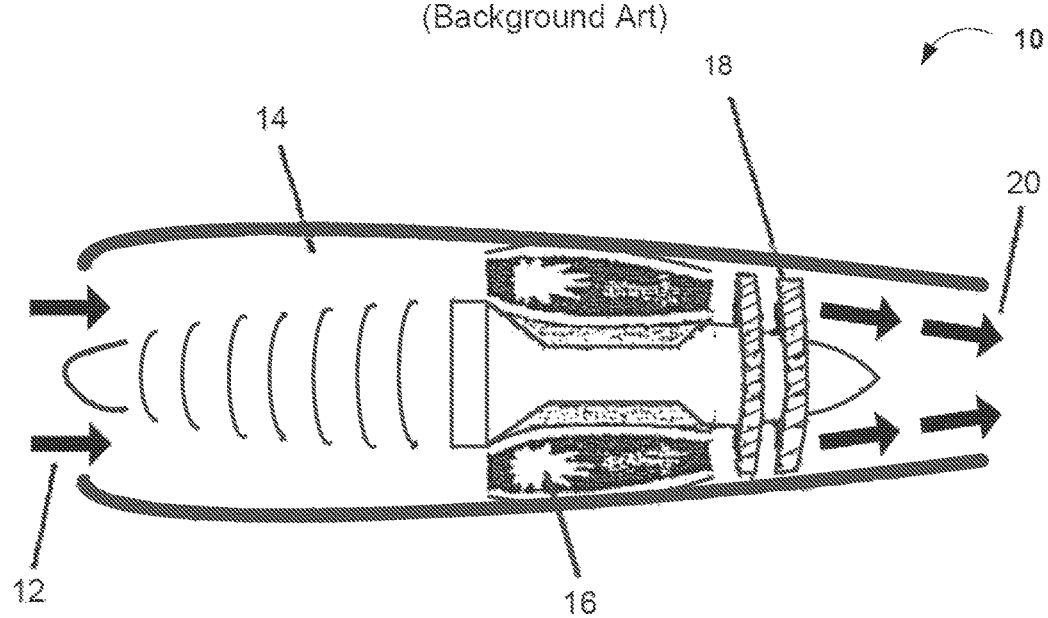
FIG. 1A is a cross-sectional view of a conventional gas turbine engine.
Figure 1B:
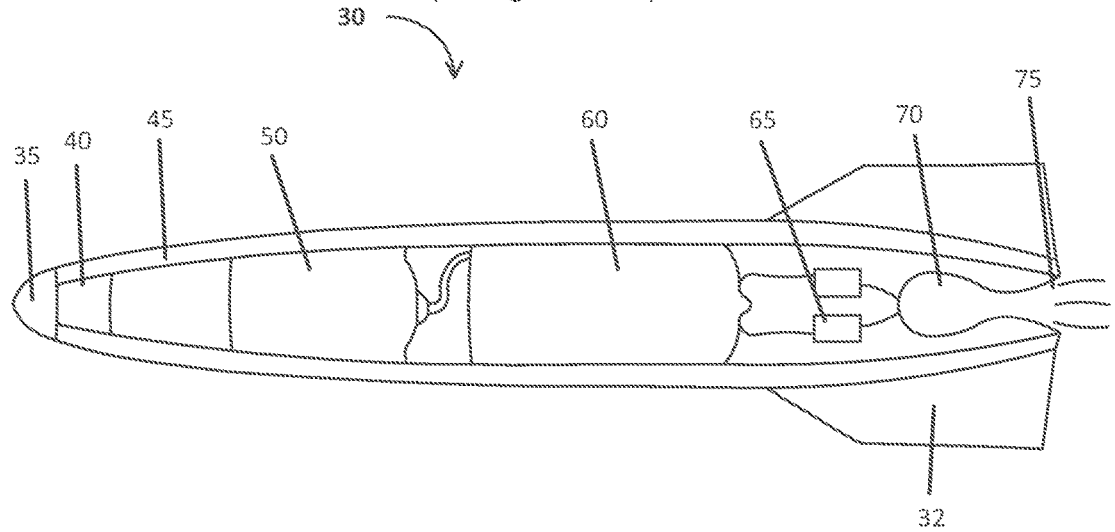
FIG. 1B is a cross-sectional view of a conventional rocket engine.
Figure 2A:
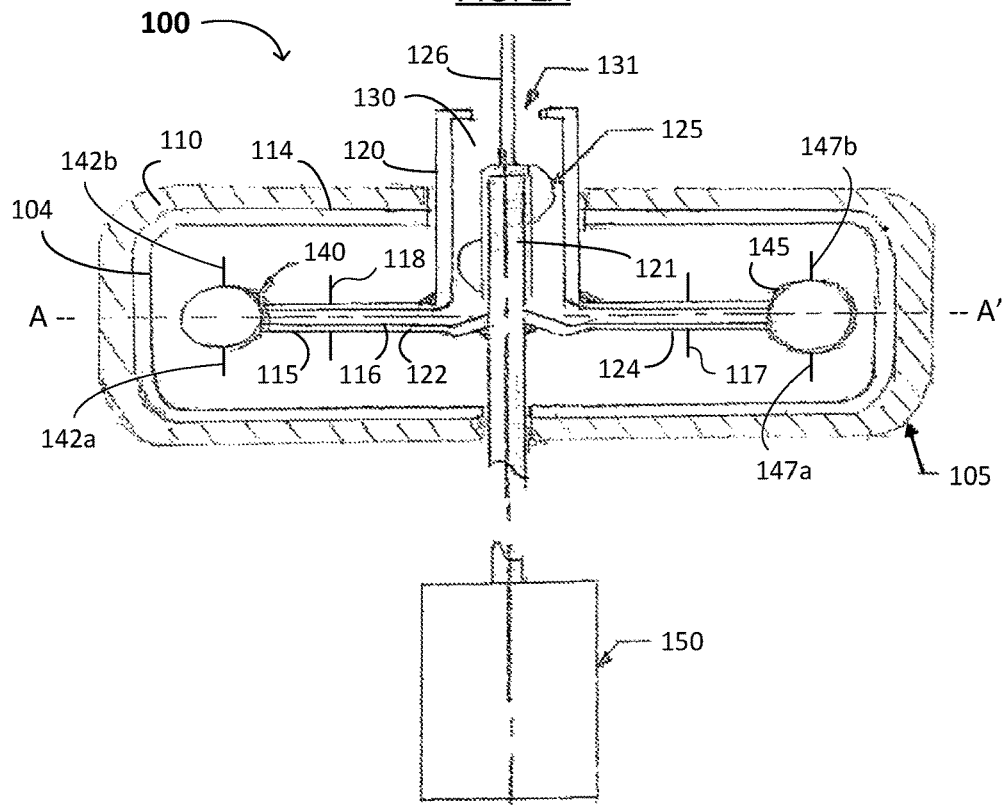
FIG. 2A is a cross-sectional view of an exemplary engine according to the present invention.
Figure 2B:
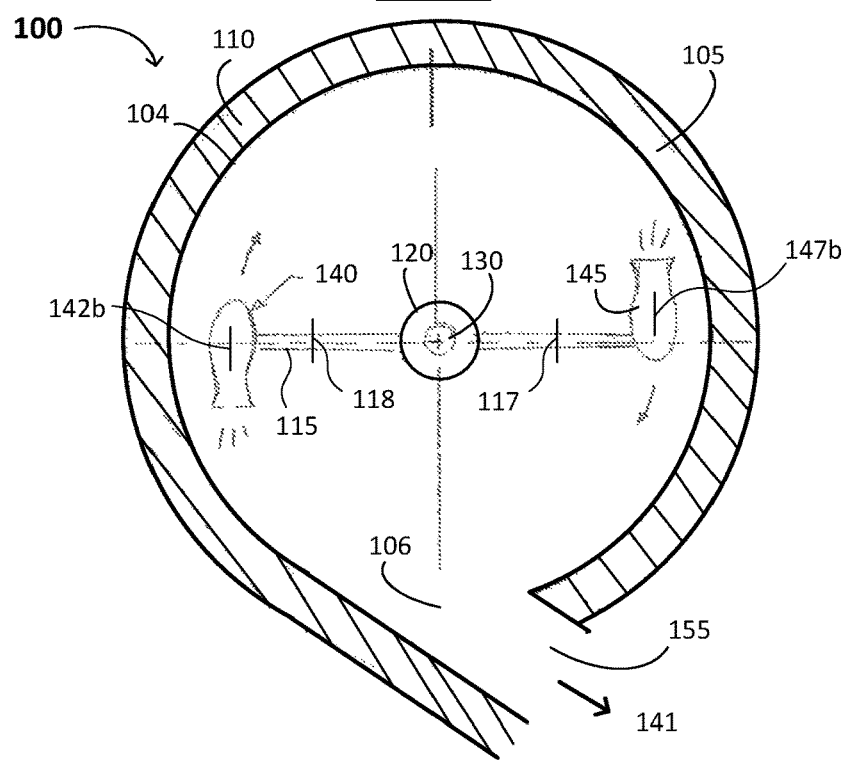
FIG. 2B is a top-down view of the exemplary engine of FIG. 2A showing at least one exhaust port according to the present invention.

FIGS. 2A-2B show an exemplary engine 100 according to the present invention. The engine 100 generally comprises a housing 110, a central rotary shaft 120 having one or more rotational arms (e.g., first and second rotational arms 122 and 124), at least one fuel and air supply channel 130, at least two (2) propulsion vessels 140 and 145, and at least one exhaust duct 155. The propulsion vessels 140 and 145 push themselves forward by pushing out thrust material similar to a rocket engine, but in which the propulsion vessels 140 and 145 are in a fixed place (e.g., a fixed orbit around the central rotary shaft 120). They can be as simple as the burners shown in FIG. 4B or the combustion chambers/nozzles shown in FIG. 5, or as sophisticated as a rocket engine (e.g., as shown in FIG. 1B, but without fuel storage) or a jet engine (e.g., as shown in FIG. 1A). The engine 100 uses the propulsion vessels 140 and 145 to turn the central rotary shaft 120 and create a rotational force that drives or powers a motor, for aircraft and/or other vehicles, for generating electricity, or for any other purpose for which engines that create or generate rotational force can be used.

FIG. 2A shows an embodiment of the present engine 100. FIG. 2A is a cross-sectional view of the engine 100 along the A-A' plane in FIG. 2B. In exemplary embodiments, the housing 110 has an outer wall 104 and at least one opening 106 leading to an exhaust duct or port 155. The circumference of the outer wall 104 may vary depending on the size of the propulsion vessels 140, 145 and the length of the rotational arms 122, 124. Generally, the housing 110 has a round or toroidal shape, configured to allow rotation of the propulsion vessels 140, 145.

In some embodiments, the housing 110 may have an insulation layer 105 on the outer wall of the housing 110. Typically, the insulation layer 105 is a thermo-insulative material. Other various insulative materials may also be used for the insulation layer, such as polyurethane foam, expanded polystyrene, expanded perlite, fiberglass, and/or cork.

As shown in FIG. 2A, the central rotary shaft 120 has a central axis 121 with rotational arms 122 and 124 that extend from the rotary shaft 120. In some embodiments, the central rotary shaft 120 extends from the rear-facing surface 114 of the housing 110, and in other embodiments, the central rotary shaft 120 extends from both the front-facing and rear-facing surfaces 112 and 114 of the housing 110. The central rotary shaft 120 may be connected or joined to a coaxial rod or cable 126 at one end, and the rod or cable 126 may have one or more gears or fans at another end (i.e., of the rod or cable 126). The engine 100 includes a generator 150 configured to receive a rotational force (or other form of mechanical energy) from the central rotary shaft 120. Other forms of mechanical energy received by the generator 150 are generally indirect; e.g., the central rotary shaft 120 may drive a belt that, in turn, drives a wheel in the generator 150. Alternatively, the central rotary shaft 120 may drive a wheel or other mechanism that, in turn, drives a piston, cam, or other mechanism that can generate work, power, or electricity.

A fuel and air supply and/or distribution channel 130 advantageously supplies a fuel and an oxidizer from a fuel storage tank (not shown) and an oxidizer intake (e.g., an air intake or inlet; not shown), respectively to the propulsion vessels 140 and 145. While air is the least expensive and most common oxidizer, other oxidizers, such as ozone, hydrogen peroxide, nitrous oxide, nitric oxide, etc., can be used or added. The fuel and air supply and/or distribution channel 130 has a first portion (e.g., 115, 116 in one of the first and second arms 122 and 124) that extends radially from the rotary shaft 120, and a second portion (e.g., surrounding the rotary shaft 120) in fluidic communication with the first portion 115, 116. The second portion may have at least one opening 131 for fuel and air supply. In some embodiments, the fuel and air supply channel 130 includes a single conduit or path that supplies the fuel and air. Alternatively, the fuel and air supply channel 130 includes at least two conduits or paths (see, e.g., FIGS. 3A-B). When the fuel and air supply channel 130 includes two conduits or paths, a first conduit or path may supply fuel, and a second conduit or path may supply air. Alternatively, the fuel and air supply and/or distribution channel 130 may include separate conduits for transferring the fuel and/or oxidizer (e.g., air) along the central axis 120 and each of the rotational arms 122 and 124.

In exemplary embodiments, the engine 100 includes at least two propulsion vessels 140 and 145 (e.g., rocket-like engines). Preferably, the engine 100 has an even number of propulsion vessels and the same number of arms (e.g., 2, 4, 6, 8, etc.). However, the number of propulsion vessels and the number of arms may be 3, 5, 9, etc. (e.g., any number by which 360 can be evenly divided to give an integer or a regular fraction). One side or surface (e.g., a side or surface facing the central shaft 120) of each of the propulsion vessels 140 and 145 is connected to (i) a rotational arm 122 or 124 and (ii) the fuel and air supply channel 130. Depending on the number of propulsion vessels, the number of rotational arms may vary. The ratio of propulsion vessels to rotational arms is generally, but not limited to, 1:1. For example, multiple propulsion vessels (e.g., 2 or more) can be positioned and/or affixed at the end of each rotational arm. Propulsion vessels may be attached to the rotational arm by various methods, including, but not limited to, welding. Each propulsion vessel is configured to burn or detonate the fuel, and rotate around the central rotary shaft 120.

Each of the rotational arms 122 and 124 may have one or more fins 117, 118 thereon, and each of the propulsion vessels 140 and 145 may have one or more fins 142a-b, 147a-b thereon. The rotational arms 122 and 124 may pass through the corresponding fin(s) 117, 118, but the fins 142a and 142b may be respectively on opposite upper and lower surfaces of the propulsion vessel 140, and the fins 147a and 147b may be respectively on opposite upper and lower surfaces of the propulsion vessel 145, The fins may be at an angle with respect to a vertical or horizontal plane (e.g., along the long axis of the propulsion vessel or along the rotational arms) or may be curved (e.g., along a circular arc defined by the rotational path of the arms and/or propulsion vessels).

FIG. 2B is a top-down view of the engine 100 along the A-A' plane in FIG. 2A. The engine 100 includes at least one exhaust duct (vent or port) 155 that extends from the housing 110. The exhaust duct 155 is configured to direct exhaust 141 from the housing 110 in a direction away from the rear surface 114 (e.g., to a turbo unit; see FIG. 2A).

As a result, the present engine, having at least two propulsion vessels (e.g., burners or rockets), a fuel and air supply or distribution channel, and a shaft along with a central axis (with at least one rotational arm), are connected together in unity and form one moving unit. Preferably, the present propulsion vessels, arms, and shaft rotate in one direction, and the present engine provides a motive force in one direction. Thus, the efficiency of the system may be relatively high compared to most conventional engines. Furthermore, the present engine may have less wear and tear, and may be relatively easy to build, maintain, and service.

Figure 3A:
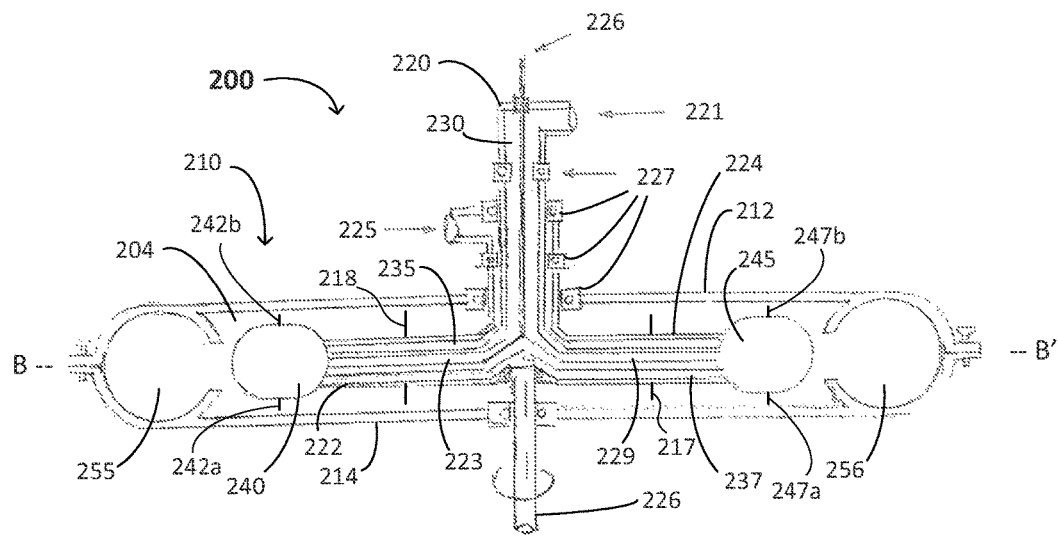
FIG. 3A is a cross-sectional view of yet another exemplary engine having at least two exhaust ports according to the present invention.
Figure 3B:
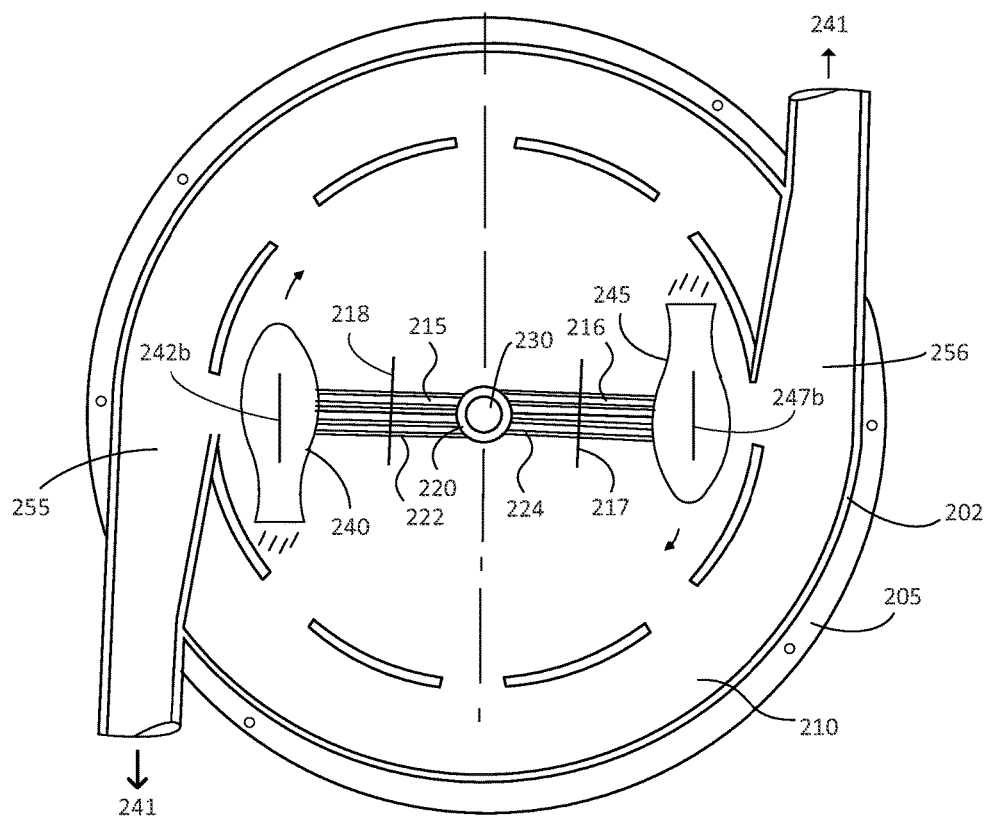
FIG. 3B is a diagram of the exemplary engine of FIG. 3A having at least two exhaust ports according to the present invention.

FIGS. 3A-3B show another exemplary engine 200 according to the present invention, having at least two exhaust ducts 255, 256 that may exhibit improved stability (e.g., balance) of the engine. The engine 200 generally includes a housing 210, a central rotary shaft 220 having one or more rotational arms (e.g., first and second rotational arms 222, 224), at least one fuel and air supply channel 230, at least two propulsion vessels 240 and 245, and at least two exhaust ducts 255, 256.

FIG. 3A shows an embodiment of the present engine 200, in which FIG. 3A is a cross-sectional view of the engine 200 along the B-B' plane in FIG. 3B. The present engine 200 advantageously provides a rotational force to power the motor. The dual-exhaust design may provide additional stability for aircraft and other vehicles.

In exemplary embodiments, the housing 210 has an inner wall 203 that includes a plurality of openings 206, and an outer wall 202. The plurality of openings 206 in the inner wall 203 provide cross flow, reverse flow and/or cyclone flow, thus separately creating turbulence inside the housing 210. Preferably, the housing 210 has a round or toroidal shape, with a space 204 within the inner wall 203 of the housing 210 configured to allow rotation of the propulsion vessels 240, 245. In some embodiments, the housing 210 may have an insulation layer 205 (e.g., thermo-insulative material) on the outer wall 202 of the housing 210. Materials of the insulation layer 205 are the same as described elsewhere herein.

In various embodiments, the central rotary shaft 220 extends from the housing 210. In some embodiments, the central rotary shaft 220 extends from the rear-facing surface 214 of the housing 210, and in other embodiments, the central rotary shaft 220 extends from both the front and rear-facing surfaces 212 and 214 of the housing 210. The central rotary shaft 220 may be connected or joined to a coaxial rod or cable 226 at one end, and the rod or cable 226 may have one or more gears or fans at another end (i.e., an opposite end of the rod or cable 226).

As described for the engine 100 in FIGS. 2A-B, the fuel and air supply and/or distribution channel 230 advantageously supplies a fuel and an oxidizer (e.g., from a fuel storage tank) to the propulsion vessels 240 and 245. Similarly, the fuel and air supply channel 230 may have an opening 221 and one or two conduits or paths (e.g., 223 and 229), as discussed above with regard to FIGS. 2A-B. The fuel and air supply and/or distribution channel 230 has a first portion (e.g., 215, 216 in one or both of the first and second arms 222 and 224) that extends radially from the rotary shaft 220, and a second portion (e.g., surrounding the rotary shaft 220) in fluidic communication with the first portion 215, 216. A second portion of the fuel and air supply channel 230 may have an opening 225 for fuel and/or air supply along annular paths 235 and 237 to the propulsion vessels 240 and 245. For example, the second portion of the fuel and air supply channel 230 may carry an oxidizer (e.g., air, oxygen, oxygen-rich air, etc.) to the propulsion vessels 240 and 245 to facilitate greater and/or more thorough combustion of the fuel. Alternatively, the paths 235 and 237 may carry a second fuel (e.g., igniter or pilot light fuel) to the propulsion vessels 240 and 245, or supply cooling water to the propulsion vessels 240 and 245.

In various embodiments, the second portion of the fuel and air supply channel 230 may include bearings 227 configured to maintain an airtight supply of air, fuel or both to the housing 210. Also, the bearings 227 allow certain parts to rotate, while others stay fixed. Preferably, there are at least five sets of bearings 227 having a ring-shaped or toroidal cross-section located around the central shaft 220, as shown in FIG. 3A. The bearings 227 generally are positioned around the central shaft 220, between the central shaft 220 and an immediately adjacent part or unit (e.g., one or more conduits of the fuel and air supply channel 230, the front and/or rear surfaces 212 and 214 of the housing 210, or other surface of the housing 210).

In exemplary embodiments, the engine 200 includes at least two propulsion vessels 240, 245 (e.g., rocket-like engines). Preferably, the engine 200 has an even number of propulsion vessels, but the number of propulsion vessels may be 3, 4, 5, 6, 8, or any other integer that, when multiplied by an integer or fraction with a fixed number of decimals (e.g., 22½), equals 360. The propulsion vessels and arms may also be offset from each other in a regular pattern, relative to a horizontal plane passing through at least some of the propulsion vessels and/or arms (e.g., alternating burner/arm combinations may be above or below the horizontal B-B' plane through the engine 200 in FIG. 3A). One side or surface (e.g., a side or surface facing the central shaft 230) of each of the propulsion vessels 240 and 245 is connected to (i) a rotational arm 222 or 224, and (ii) the fuel and air supply channel 230. Depending on the number of propulsion vessels, the numbers of rotational arms may vary. Each propulsion vessel is configured to burn or detonate the fuel, and rotate around the central rotary shaft 220. Preferably, the propulsion vessels include an igniter (see FIG. 4B). The igniter may be downstream from an outlet or opening for fuel and air mixture 221, 225, and ignite the fuel fed into the propulsion vessel 240, 245 from the fuel and air supply channel 230.

FIG. 3B is a top-down view of the engine 200 along the B-B' plane in FIG. 3A. In exemplary embodiments, the housing 210 has an inner wall 203 and an outer wall 202. Preferably, the inner wall 203 of the housing 210 has a plurality of openings 206 leading to at least two exhaust ducts or ports 255, 256. The number of openings 206 may be 2, 3, 4, 5, 6, 8, or any other integer than, when multiplied by an integer or fraction with a fixed number of decimals, equals 360. In addition, the openings 206 may be located anywhere along the inner wall 203 of the housing 210. However, locations along the center of the inner wall (as shown) may be preferred. Furthermore, the openings 206 may be evenly spaced or concentrated (e.g., before or after the entrances to the ducts or exhaust ports 255, 256).

The circumference of the inner and outer walls 203, 206 may vary, depending on the size of the propulsion vessels 240, 245 and the length of the rotational arms 222, 224. The engine 200 includes at least two exhaust ducts (vents or ports) 255, 256 that extend from the housing 210. The exhaust ducts 255, 256 may be configured to direct exhaust 241 from the housing 210 in a direction away from the rear surface 214 (e.g., to the turbo unit; not shown).

In some embodiments, a reflector (not shown) may be at the end of the ducts or exhaust ports 255, 256 to direct the thrust from the housing 210 to a turbo unit or in a rear-facing direction. Subsequently, the exhaust may be channeled or directed to a location or stage of the engine where the exhaust can perform work (e.g., in the turbo unit [not shown], that may include one or more turbine fans). Similar to the embodiment(s) of FIGS. 2A-B, Each of the rotational arms 222 and 224 may have one or more fins 217, 218 thereon, and each of the propulsion vessels 240 and 245 may have one or more fins 242*a-b*, 247*a-b* thereon. The rotational arms 222 and 224 may pass through the corresponding fin(s) 217, 218, but the fins 242*a* and 242*b* may be respectively on opposite upper and lower surfaces of the propulsion vessel 240, and the fins 247*a* and 247*b* may be respectively on opposite upper and lower surfaces of the propulsion vessel 245, The fins may be at an angle with respect to a vertical or horizontal plane (e.g., along the long axis of the propulsion vessel or along the rotational arms) or may be curved (e.g., along a circular arc defined by the rotational path of the arms and/or propulsion vessels).

Figure 4A:
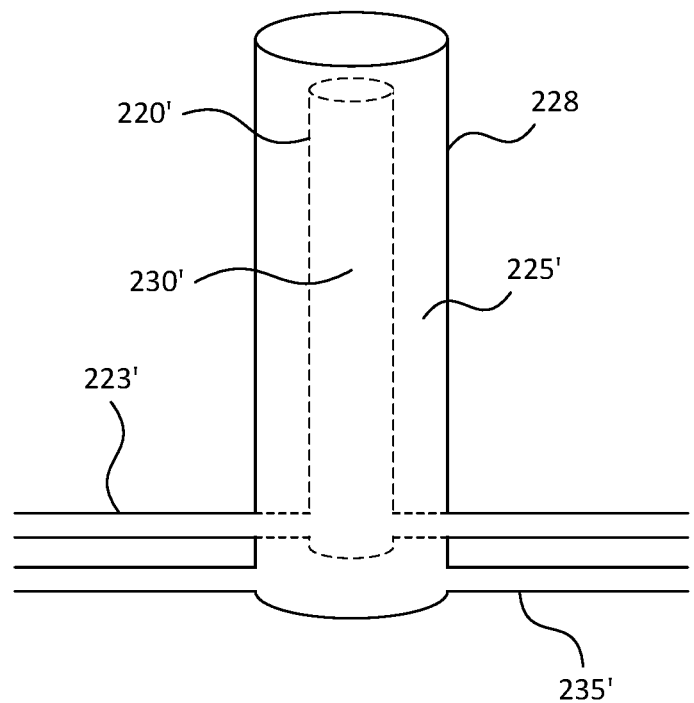
FIG. 4A is a diagram showing an exemplary coaxial fuel and oxidizer/air supply channel(s)

FIG. 4A is a diagram showing a cross-section of coaxial fuel and air supply and/or distribution channels 225'-230', which advantageously supply a fuel (e.g., through channel 230') and an oxidizer (e.g., air, through channel 235') to the propulsion vessels. The coaxial fuel and air supply channels may have two separate conduits or paths (e.g., 223' and 235'), respectively, from channels 230' and 225'. The arms defining channels 223' and 235' that extend radially from the coaxial fuel and air supply channels are in fluid communication with the channels 230' and 225'. The embodiment shown in FIG. 4A is advantageously easy and inexpensive to manufacture, but the embodiment shown in FIGS. 3A-B may be more robust and/or durable. Alternatively, for example, when the oxidizer is in the gas phase (e.g., air or oxygen), the arm 223' or 235' may include a single tube or pipe extending through the channel 225' or 230', with holes in the portion of the tube or pipe within the channel 225' or 230' to enable the gas-phase oxidizer to pass easily into the arm 223' or 235'.

Figure 4B:
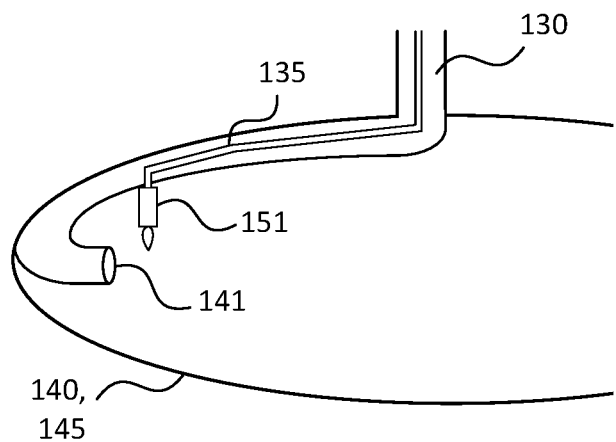
FIG. 4B is a diagram showing an exemplary connection of the fuel and air channel to the propulsion vessel, according to the present invention.

FIG. 4B is a diagram showing the connection of the fuel and air supply channel 130 to the propulsion vessel 140' or 145', according to an embodiment of the present invention. Each propulsion vessel may include an ignition device, such as a pilot light or other igniter 151.

The igniter 151 may be downstream from an outlet 141 of the fuel and air supply channel 130 (e.g., an opening for introducing a fuel and air mixture into the propulsion vessel 140), and ignite the fuel introduced into the propulsion vessel 140 or 145 from the fuel and air supply channel 130. The igniter 151 may include various forms of ignition devices known in the art, including, but not limited to, a pilot light. Alternatively, the igniter 151 may include an electrical igniter (e.g., 1 spark generator or spark plug). Preferably, the pilot light 151 is connected to the propulsion vessel by the pilot light fuel tube 135, which may be part of or alongside the fuel and air supply channel 130.

Thus, the present engine or system includes a combustor (e.g., combustion chamber) with a nozzle (not shown) for introducing the fuel to the propulsion vessels. The fuel nozzle spray atomizes the fuel mixture, and the ignition device ignites the fuel mixture or spray in the propulsion vessel. As a result, flames expand out of the nozzle and provide thrust for the propulsion vessel, which drives the central rotary shaft through the rotation arms and/or provides force from and/or for the engine. Consequently, the propulsion vessels rotate in a predetermined direction and drive the rotation arms, spinning the central rotary (axis) shaft and driving any fans attached, fastened or affixed thereto.

An Exemplary Propulsion Vessel

FIG. 5 is a diagram showing another exemplary combustion chamber 300 according to the present invention. The combustion chamber 300 of FIG. 5 includes a plurality of sections and at least two air flow paths. The exemplary 300 includes a fuel and compressed air inlet section 310, combustion sections 320 and 330, and a thrust and/or exhaust section 340. The nozzle connected to the exhaust section 340 is not shown in FIG. 5. The inlet section 310 includes an ignition system 312 to light the fuel and air mixture during start-up of the engine. Exemplary components for the combustion section 330 and thrust and/or exhaust section 340 are described in more detail with regard to FIGS. 6(A)-(E), 7 and 8.

In a second, peripheral air flow path 306, part of the influent air 303 passes into the fuel storage section 320 and expels thrust as air (which may be heated as it passes through the engine 300) into the exhaust. Influent air 303 similarly passes through into combustion section 330 and exhaust section 340. About 20-30% of the total air introduced into the engine 300 contributes to combustion. Generally, "diluted" air 303 counts for about 70-80% of the total air introduced into the engine 300 and providing thrust from the engine.

An Exemplary Hybrid Turbine Engine

An exemplary hybrid turbine engine generally includes the exemplary engines described above in FIGS. 2A-3B, and a compressor, a turbine, one or more turbine fans, and a housing unit (see, e.g., FIG. 1 for examples of a compressor, turbine, turbine fan[s], and/or a turbine engine housing unit). Preferably, the hybrid turbine engine design can be constructed in a wide range of sizes (e.g., engines having a diameter in a range of about 3 inches to about 15 feet, or any value or range of values therein). In addition, the hybrid turbine engine may have a number of applications, including unmanned vehicles (e.g., air, water, and ground unmanned vehicles) and air, water, and ground passenger vehicles (e.g., commercial aircraft). Also, the hybrid turbine engine may be used for generation of energy or electricity, mechanical work (e.g., in heavy industry, to move large masses or drive large pumps), etc.

In some embodiments, the compressor includes one or more rotary fans (e.g., turbine fans) rotatably fixed to an engine shaft upstream of or from the housing. The compressor draws air from the opening at the front of the engine, compresses the air at a relatively high pressure, and forces the compressed air through the turbine, providing a spinning force for the compressor.

Preferably, the fans may be rotatably fixed to the engine shaft, upstream or downstream from the engine. Generally, the propulsion vessel may have a substantially torpedo or barrel shape. For example or alternatively, the housing may be substantially cylindrical with one or both ends having a truncated cone shape. The one or more turbine fans may have a varied cross-sectional area along its length to maximize thrust as air is expelled into the exhaust section.

Generally, some or most of the influent air from the one or more fans passes around the compressor and the housing of the engine of FIGS. 2A-3B to the exhaust section of the hybrid turbine engine where it provides thrust via a nozzle. Such air may be heated by the housing, which may provide additional thrust.

An Exemplary Biomass Powder Energy Conversion and/or Generation System

FIGS. 6A-B are diagrams showing an exemplary biomass powder energy conversion or generation system 400 according to the present invention. The system of FIGS. 6A-B generally includes a storage tank 401, a dispenser (including an aspirator) 410, and at least one combustion chamber 420a (FIG. 6B) or group of combustion chambers 420b (FIG. 6C). In addition, the engine of system 400 may include at least one fan 430a, 430b (e.g., a turbine fan). As a result, the present biomass powder energy generation system 400 generally consists of three major components: a powder storage unit or tank 401, the dispenser 410 that dispenses or disperses the powder-and-air mixture, and the combustion chamber 420a/420b. The present biomass powder energy generation system 400 may further include an injector, one or more fuel and air conduits, and the turbine fan(s) 430a and/or 430b.

In various embodiments, the storage tank 401 is configured to store the biomass powder. Generally, the energetic use of pulverized, solid-phase combustible material is limited. Biomass pulverization technology allows the production of micron sized powder at a relatively reasonable rate. Studies have shown that wood powder has a relatively high volatile content (e.g., 60-70%) and low heating value (17-18 MJ/kg). As a result, biomass powder may be burned or detonated efficiently in a combustion chamber.

Typically, the storage tank 401 has a sensor (not shown) configured to detect a level of the biomass powder in the storage tank 401 and an opening (not shown) configured to allow the biomass powder to be added or introduced into the storage tank 401. Generally, the storage tank 401 is a large volume tank, configured for long, continuous operation. For example, the storage tank 401 may have a volume of from about 40 L to about 3000 m$^3$ (e.g., 100 L to 2500 m$^3$, 250 L to 1000 m$^3$, or any other value or range of values therein).

The storage tank 401 has an air conduit 402 (e.g., air tube) that passes through the interior and a rotary dispensing device 403 configured to transfer the biomass powder from a collection area of the storage tank 401. In addition, the portion of the air conduit 402 inside the storage tank 401 has a plurality of holes therein. The air conduit 402 may therefore include a first section that passes through a wall of the storage tank 401 and supplies air to the biomass powder in the storage tank 401 through the holes therein, a second section having a u-shape or s-shape inside the storage tank (with at least some of the holes therein), and a third section passing through the same wall or a different wall of the storage tank 401, configured to carry excess air out of the storage tank 401. The air in the conduit 402 may be heated (e.g., from exhaust from combustion chamber, or from the compressor, which may naturally heat the compressed air).

In some embodiments, the storage tank 401 includes a rotary dispensing device 403, which may include an auger, and which may be horizontally positioned (e.g., at, along or near a bottom of the storage tank). For example, the rotary dispensing device 403 may be in a trough or well in the bottom surface of the storage tank 401. The storage tank 401 and/or rotary dispensing device 403 may have an outlet connected to an upper portion of the dispenser 410. The storage tank 401 may have a sloped inner surface, configured to allow gravity to force the biomass powder towards the auger/dispensing device 403. The auger 403 may disperse powder to the dispenser 410 in response to a signal generated from an engine controller (not shown).

Referring to FIG. 6A, the dispenser 410 is configured to receive the biomass powder through an opening in the upper portion of the dispenser 410, then suspend the biomass powder in air. For example, the dispenser 410 may include a tube 414 through an opening at or near the bottom of the dispenser 410. The tube 414 is configured to introduce (heated) air into the dispenser 410 and suspend the biomass powder therein. An aspirator (e.g., tubes 412 and 415, which may form a T-connection) draws the powder and air into tube 412 as result of air flow in the upper (e.g., horizontal) tube or conduit 412. The aspirator provides the suspension of biomass powder in air (further diluted with air flowing through the tube 412) to a fuel supply conduit 425, and thus, to the combustion chamber 420a (FIG. 6B). The dispenser 410 may include one or more heating coils (not shown) configured to heat and/or dry the biomass powder suspended in air therein. For example, turbine exhaust gas can be channeled through conduits in the dispenser 410 in a manner similar to the conduit 402 in the storage tank 401 to provide heat for the heating coils. For minimum combustible/detonable dust concentration and minimum ignition temperature, the moisture content of the biomass powder should be 4% or less. Furthermore, the dispenser 410 may have a fluidizer (e.g., comprising tube 414 that supplies air to the dispenser) at or in the bottom portion 413 of the dispenser 410, where solid biomass powder may settle in the absence of the fluidizer.

FIG. 6B shows an exemplary combustion chamber 420a. The energy conversion and/or generation system 400 has at least one combustion chamber 420a. Alternatively, the system 400 may have a plurality of combustion chambers 420a (see combustion system 420b, FIG. 6(C)). The chamber(s) 420a are configured to receive the fuel-and-air suspension from the fuel supply conduit 425. Typically, the fuel supply conduit 425 is part of or an extension of the air conduit 412, and may include a pin or valve 428 to introduce the fuel-and-air suspension into combustion chamber 420a. Each combustion chamber 420a may include inner and outer walls 421, 422, an air nozzle 424 for introducing additional air around and/or into the chamber with the propulsion vessel therein (e.g., inside the inner wall 421), and an exhaust duct (not shown). Typically, the outer wall 421 of the combustion chamber 420a is solid, and the inner wall 422 of the combustion chamber 420a has a plurality of openings 423 enabling air flow into the interior of the combustion chamber 420a, where the propulsion vessel is located and where combustion or detonation occurs. In some embodiments, the outer wall 421 may have no external openings other than at the exhaust end of the chamber 420a.

Referring to FIG. 6C, the combustion system 420b may include a plurality of combustion chambers 420a extending radially from an opening 427 for a central rotary shaft (not shown). Each combustion chamber 420a may have an air and fuel supply unit (e.g., the same as or similar to that shown in FIG. 6(B)) attached thereto. Alternatively, the combustion system 420b may have one fuel and air supply unit with a plurality of supply conduits 425 feeding fuel and air to each combustion chamber 420a. In one example, the fuel and air supply unit may have toroidal or substantially toroidal shape, and by positioned radially around the central rotary shaft. In another example, the fuel and air supply unit may be positioned to one side of the central rotary shaft (e.g., above or below, and/or to the left or right of the central shaft), and the supply conduits can be distributed radially or substantially radially to each of the combustion chambers 420a.

The system 400 may include at least one fan 430a (FIG. 6D) and/or 430b (FIG. 6E). The fan 430a of FIG. 6D may have a gear 431 and a plurality of blades 432. The gear 431 may mate with a fitting on an end of the central (rotary) shaft that passes through the opening 427 (and that may be further connected to the fan 430b of FIG. 6E on an opposite side or end of the combustion system 420b). The fan 430b of FIG. 6E may comprise a turbine fan. The turbine fan 430b has a rotating shaft 436 that is driven by the central (rotary) shaft, and a rotary fan 435. The fan 430b may comprise an axial-flow turbine fan or a radial-inflow turbine fan, both of which are commercially available. Generally, once the application is determined and the energy requirements are calculated, the size and features of the turbine units may be selected and/or designed.

FIG. 7 shows a section of a further exemplary combustion chamber 500 and one or more air supply channels thereto, in which the inner wall 522 of the combustion chamber has a plurality of holes 523 for generating cross flow, reverse flow and/or cyclone flow therein. Such flow(s) create turbulence inside the chamber 500 as air is supplied to the combustion/detonation cavity inside the inner wall 522 via air conduit 526. Air from the air conduit 526 that does not flow into the combustion/detonation cavity inside the inner wall 522 can cool the chamber 500, and as it absorbs heat from the combustion/detonation cavity inside the inner wall 522, it can expand and provide additional thrust. Additional air flow inside the chamber 500 can be provided by one or more auxiliary and/or direct air conduits 525a-b. The exemplary combustion chamber 500 advantageously distributes air to or around the site of combustion and/or detonation in the chamber, which can have various physical dimensions and fuel/air operation ranges.

Figure 8:
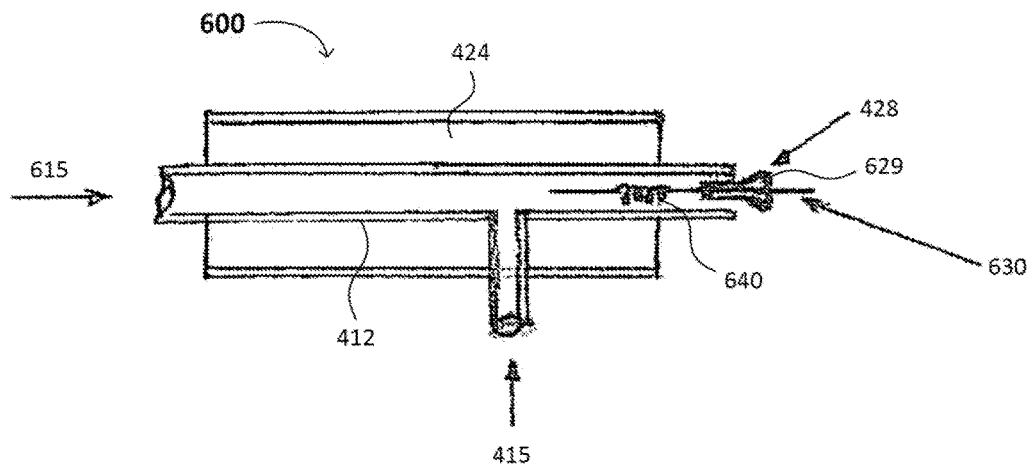
FIG. 8 is diagram showing an exemplary powder fuel nozzle for the combustion and/or detonation chamber in the exemplary biomass powder energy generation system.

Referring to FIG. 8, the needle or valve 428 (see also FIG. 6) for a fuel nozzle to the combustion chamber may include an electrically charged electrode (e.g., a pin 630, the same as or similar to pin 428 of FIG. 6(B)) at one end 615 of the fuel supply conduit 412. An induction coil 640 electrically connected to the pin 630 receives a predetermined voltage from a voltage generator (not shown) nearby, and the end of the pin 630 inside the fuel supply conduit 412 may be conventionally secured to an (electrically insulated) inner surface of the fuel supply conduit 412. In addition, the needle or valve 428 may include a fuel divergence control device 629.

The biomass powder and air mixture is supplied from tube 415 to an air conduit 412 due to air flow 615 through the conduit 412. The spring or coil 640 may have a spring constant that enables the needle or valve 428 to open when the pressure of the air flow 615 through the conduit 412 is greater than the pressure inside the combustion chamber or cavity and the force of the spring or coil 640, and to close when the pressure inside the combustion chamber or cavity is about the same as or greater than the pressure of the air flow 615 through the conduit 412. In this manner, fuel can be safely supplied to the combustion chamber, without uncontrolled combustion or detonation of the fuel.

The same electric charge (e.g., positive or negative) is applied to both the combustion chamber wall and the pin 630. As the biomass powder (e.g., sawdust) flows past the pin 630, it becomes charged with the same charge as the combustion chamber wall. As a result, the biomass powder particles remain suspended in the combustion chamber, and advantageously do not stick or adhere to the inner wall of the combustion chamber.

A key factor in the performance of the exemplary chamber 420a is the turbine fan 430a, as shown in FIG. 6D. For example, in a conventional turbine engine, transportation of particles (e.g., unburned fuel, incompletely and/or inefficiently burned fuel, and/or other particles that may enter the engine) to the turbine fan 430a can cause disruption of the turbine blades 432 and/or abrasion to the inner surfaces of the turbine blades 432. The present combustion chamber advantageously achieves complete combustion of the fuel, and thus, maximum fuel efficiency and minimal transportation of particles through the exhaust to the turbine fan, thereby enabling a fan design that increases or maximizes use of thrust from the exhaust gases leaving the combustion/detonation chamber(s).

Figure 9A:
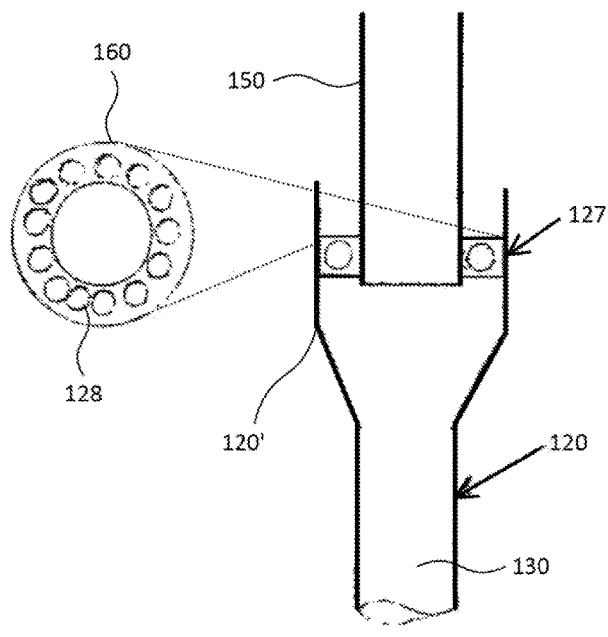
FIGS. 9A-B are cross-sectional diagrams of exemplary stationary-rotary channel interfaces using coaxial bearings, according to the present invention.

FIG. 9A is a cross-sectional diagram of an exemplary stationary-rotary channel interface using a coaxial bearing 127, according to the present invention. The fuel-and-air channel 130 is in the rotating central shaft 120. A high-speed, conventional coaxial bearing 127 comprising a plurality of balls 128 within a housing 160 fits tightly between a flange 120' on the rotating central shaft 120 and a stationary shaft 150 that feeds or supplies the fuel-and-air mixture from the fuel supply system (e.g., 400 in FIG. 6) to the rotary central shaft 120.

Figure 9B:
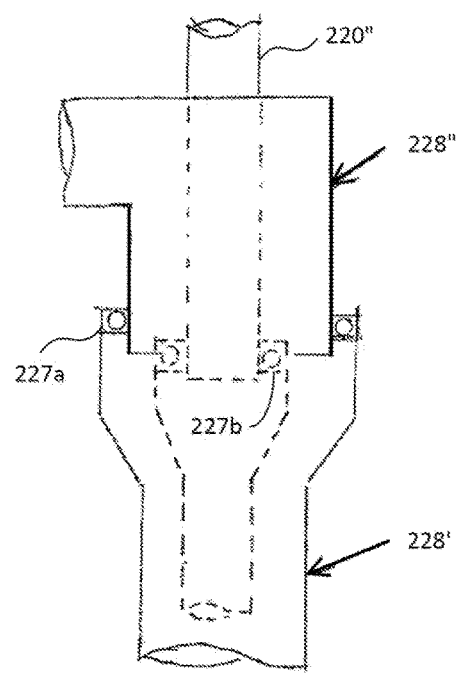

FIG. 9B is a cross-sectional diagram of an exemplary stationary-rotary channel interface using a plurality of coaxial bearings 227a-b, according to the present invention. The stationary central shaft 220" feeds one of the fuel and the oxidizer to a rotary central shaft 220'''. A high-speed, air-tight, conventional coaxial bearing 227b fits tightly between a flange on the rotary central shaft 220''' and the stationary shaft 220". A second high-speed, conventional coaxial bearing 227a fits tightly between a flange on the rotary outer channel housing/shaft 228' and the stationary outer channel housing/shaft 228". In this way, no fuel or oxidizer is lost at the interface between a stationary supply conduit and a rotary supply conduit in the present engine.

Another Exemplary Hybrid Turbine Engine

In various embodiments, another exemplary hybrid turbine engine generally includes the combustion system described above with regard to FIGS. 6(A)-(E), 7 and 8 that includes a storage tank, a dispenser, and at least one housing, along with other conventional components of a turbine engine (e.g., a compressor, a turbine, one or more turbine fans, and/or a housing unit, for example as shown in FIG. 1). Alternatively, various designs of the housing and/or combustion chamber may be used depending on the application of the engine.

In some embodiments, the compressor includes one or more rotary fans rotatably fixed to the central shaft upstream of the housing. The compressor draws air from the opening at the front of the engine and forces the compressed air through the housing and/or combustion chamber, the exhaust from which drives a turbine fan, which provides a rotary or spinning force for the rotary fan(s) in the compressor.

Alternatively, the fans (rotary and turbine) are rotatably fixed to the engine shaft, upstream or downstream from the engine. Generally, the propulsion vessel may have substantially a torpedo or barrel shape, with one or both ends having a truncated cone shape. For example, the propulsion vessel may be substantially cylindrical, with an increasing radius towards the middle of the cylinder along the axis of the cylinder.

An Exemplary Method of Converting Energy

Figure 10:
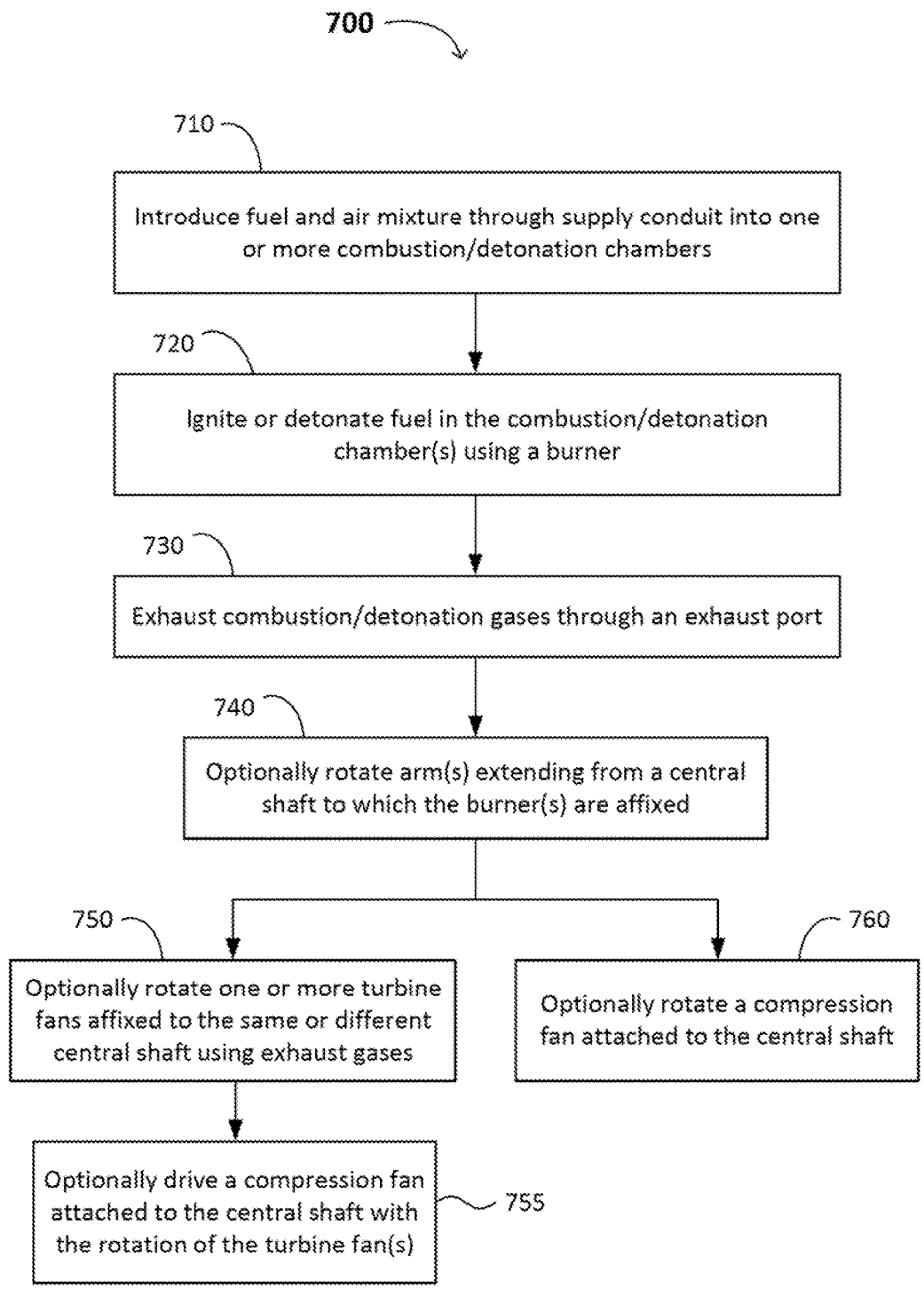
FIG. 10 is a flow chart indicating an exemplary method of converting energy according to the present invention.

FIG. 10 is a flowchart 700 showing steps of an exemplary method of converting stored chemical energy (e.g., in the form of a biomass powder) into mechanical energy. The exemplary method generally includes introducing a fuel and air mixture into a combustion chamber, igniting or detonating the fuel using a propulsion vessel in the combustion chamber, igniting the fuel using a pilot lighter and/or spark plug in the combustion chamber, and exhausting gas(es) through at least one opening in a wall of the combustion chamber and at least one exhaust vent or port. Although the exemplary fuel in this method is a biomass powder, other fuels may be appropriate for the method. Generally, the present method is conducted using equipment described elsewhere in this application.

At step 710, the fuel and air are introduced into one or more combustion chambers, generally as described herein. In various embodiments of the method, the fuel is introduced into the combustion chamber through a fuel and air supply conduit. When there is more than one combustion chamber, each combustion chamber may have its own fuel and air supply conduit. The fuel and air supply and/or distribution conduit and/or channel supplies the fuel and an oxidizer from a fuel storage tank and an oxidizer intake. The fuel and air or oxidizer channels and/or conduits may be along the central axis and/or the rotational arms extending from the central shaft to the respective propulsion vessels.

At 720, the fuel is ignited or detonated in the chamber by a propulsion vessel (e.g., burner). Preferably, the propulsion vessels are ignited using an igniter that ignites the fuel fed into the propulsion vessel from the fuel and air supply conduit. Generally, the fuel is introduced to the propulsion vessels via a needle or valve that sprays or atomizes the fuel mixture into the propulsion vessel, and then the fuel mixture is ignited in the propulsion vessel. As a result, flames expand out of the propulsion vessel exhaust port at 730 and provide thrust for the engine.

At 730, the combustion and/or detonation gas(es) from the propulsion vessel(s) are exhausted through at least one opening in an inner wall of the combustion chamber and at least one exhaust vent or port. The exhaust vent(s) or port(s) may extend through an outer wall of the combustion chamber. Subsequently, the exhaust may be directed from the exhaust vent(s) or port(s) in a direction away from the rear surface of the combustion chamber to a turbo unit using a reflector. Alternatively, thrust may be directed directly from the combustion chamber (e.g., combustion system 420*b*, FIG. 6(B)) to the turbo unit, and subsequently channeling or directing the exhaust to a location or stage of the engine where the exhaust can perform work (e.g., in the turbo unit, which may include one or more turbine fans).

At 740, in exemplary embodiments of the present method, the propulsion vessel(s) may be attached or affixed to rotation arms extending from the central shaft, which rotates and/or drives the central shaft by rotation of the arms and/or that provides force from or for the engine. Consequently, igniting or detonating the fuel in the propulsion vessels rotates the propulsion vessels forward and drive the rotation arms, spinning the central rotary shaft and providing a rotational force for motive power or mechanical work. For example, when the engine includes a generator that receives a rotational force from the central shaft, the central rotary shaft may rotate or drive a wheel in the generator that, in turn, drives a belt, piston, cam, or other work, power, or electricity generating mechanism. In one embodiment, at 750, one or more turbine fans are rotated by the exhaust from the combustion chamber as described herein. Such turbine fans may be attached or affixed to the same or different central shaft (e.g., a shaft that is collinear or coaxial with the central shaft), and the shaft to which the turbine fan(s) are attached (which may pass through the center of the combustion chamber) may drive a compression fan at 755. In an additional or alternative embodiment, at 760, the compression fan in front of the combustion chamber attached or affixed to the central shaft may be rotated (e.g., without assistance from the turbine fan[s]). Subsequently, compressed air is supplied to the combustion chamber (e.g., before the air is mixed with the fuel or fuel-and-air suspension).

An Exemplary Method of Converting Biomass to Mechanical Energy

Figure 11:
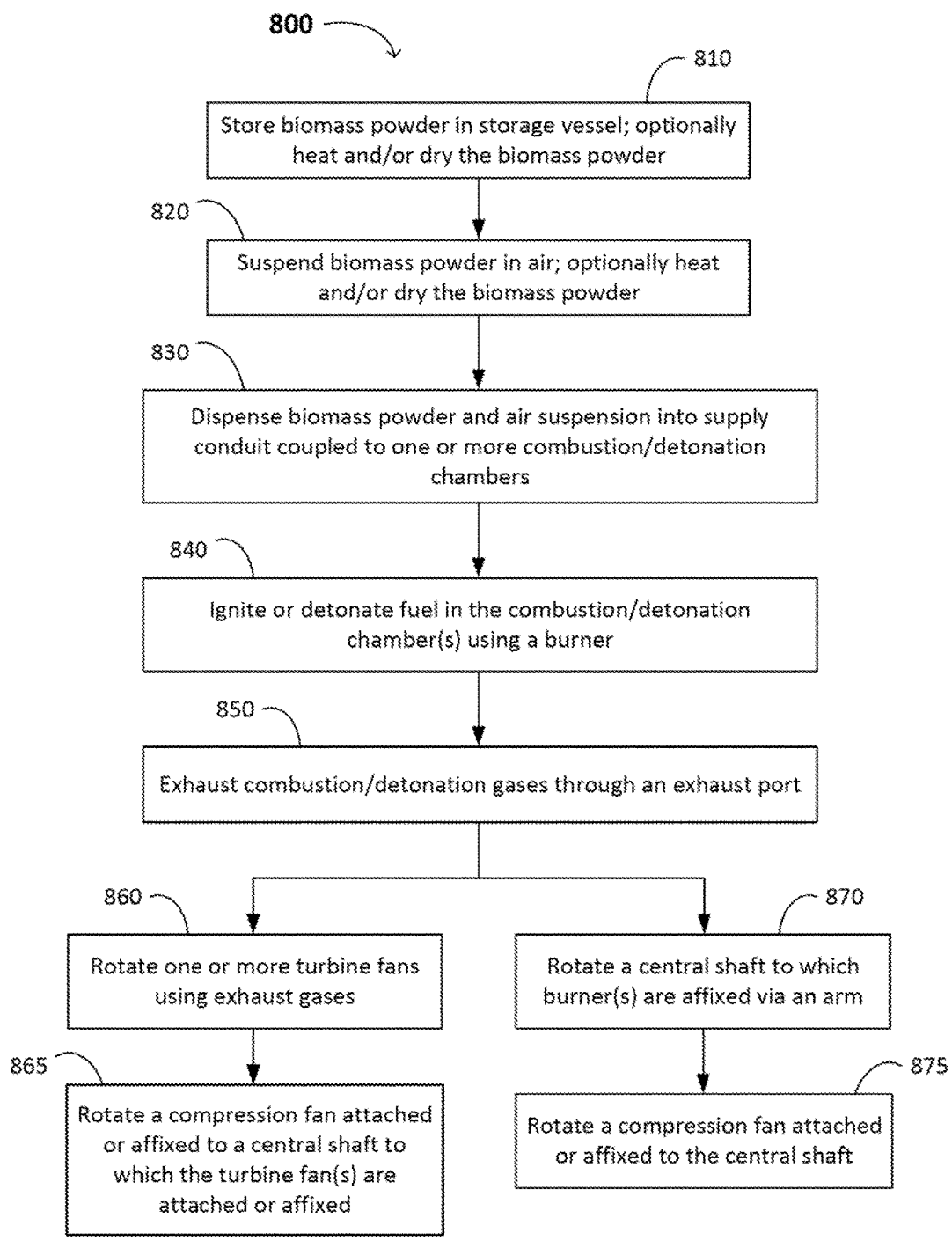
FIG. 11 is a flow chart indicating an exemplary method of converting biomass powder to mechanical energy according to the present invention.

FIG. 11 is a flowchart 800 showing steps of an exemplary method of converting biomass powder to mechanical energy. The method generally comprises introducing a biomass powder into a dispenser from a storage tank or chamber, dispersing or suspending the biomass powder in air in the dispenser, dispensing or supplying the suspension of biomass powder and air from the dispenser (e.g., using an aspirator) to a combustion chamber, burning and/or detonating the biomass powder in at least one propulsion vessel in the combustion chamber, and exhausting gases (e.g., combustion gases) through an exhaust duct in a wall of the combustion chamber to at least one turbine fan. In general, the turbine fan(s) are configured to perform mechanical work, or drive a rotary shaft that performs mechanical work or transfers mechanical energy to another device that performs mechanical work.

At 810, a biomass powder is introduced into, added to and/or stored in a storage tank or chamber. Generally, the biomass powder is supplied into the tank or chamber via an opening therein. Optionally, the biomass powder may be heated and/or dried in the storage tank or chamber. Thus, the storage tank may have an air conduit (e.g., air tube) that passes through the interior with holes therein that allow heated and/or dry air to pass over and/or through the biomass powder in the storage tank, thereby heating and/or drying the biomass powder. A rotary dispensing device (e.g., an auger) may transfer the biomass powder from a collection area (generally in the bottom) of the storage tank to a dispenser. The biomass powder may be introduced into the dispenser from the storage tank using the rotary dispensing device in response to a signal generated from an engine controller.

At 820, the biomass powder is introduced into a disperser from the storage tank, and the biomass powder is dispersed or suspended in air in the dispenser. Subsequently, a suspension of the biomass powder (e.g., powder and air mixture) in air may be drawn into an aspirator in the dispenser. In some embodiments of the present method, the biomass powder in the dispenser is heated using heating coils, which may remove moisture from the biomass powder, resulting in drier biomass powder (e.g., having a lower moisture content), and/or raise the temperature of the biomass powder, which can facilitate combustion/detonation of the fuel. In one embodiment, the method further comprises supplying air through an opening in the bottom of the dispenser to create a fluidization bed of the biomass powder.

At 830, the suspension of biomass powder and air from the dispenser is dispensed to a supply conduit, which supplies the suspension of biomass powder and air to the combustion chamber(s), as described herein. Divergence control and/or dispersion of the biomass powder may be provided at the tip or end of the outlet or nozzle of the supply conduit using a divergence control device and/or an electrified pin (which may ionize the powder). The same voltage (e.g., positive or negative) may be applied to the combustion chamber wall, to reduce or prevent powder build-up on the chamber wall.

At 840, the biomass powder is ignited, burned and/or detonated in at least one propulsion vessel in the combustion chamber. Propulsion vessel(s) in the combustion chamber(s) receive the suspension from the fuel supply conduit. In some embodiments, the combustion chamber has an inner wall and an outer wall, in which the inner wall has a plurality of openings or holes configured to allow air to enter the inner chamber of the combustion chamber and generate cross flow, reverse flow and/or cyclone flow (e.g., turbulence) inside the chamber. In some embodiments of the present method, the inner wall of the chamber is cooled by passing external air between the inner wall and the outer wall. As a result, the double chamber wall advantageously distributes air to the chamber and cools the inner chamber wall. In addition, the air that absorbs heat from the inner wall may provide additional thrust from the engine. However, when the combustion chamber does not need to be cooled, a single wall chamber may be sufficient.

At 850, combustion and/or detonation gases are exhausted or directed through an exhaust duct in the (outer) wall of the chamber to provide thrust from the engine. In one embodiment, at 860, the combustion and/or detonation gases drive at least one fan (e.g., a turbine fan). As described herein, the turbine fan(s) rotate a central shaft, which can rotate a compression fan attached or affixed to the central shaft at 865. Alternatively or additionally, a plurality of propulsion vessels may be connected to a central rotary shaft via one or more arms extending from the central shaft, and at 870, the propulsion vessels attached to the arms rotate the central shaft. At 875, the central shaft rotates a compression fan attached or affixed to the central shaft, as described herein, which can deliver compressed air to the engine.

Generally, biomass powder has a lower heating value than other fuels, such as heating oil, kerosene, and gasoline, and may require a greater volume of fuel to achieve an engine temperature achieved by engines burning fuels with higher heating values. Typically, an increase in the gas phase temperature in the combustion chamber considerably speeds up the combustion process. To ensure adequate powder entrapment for longer burning and retention of a high temperature in the combustion chamber, the present system advantageously provides a larger chamber and/or variously shaped (e.g., L-, U- and/or S-shaped) air conduits, efficient air supply and/or turbulence inside the chamber from openings in the inner wall of the chamber that generates cross flow, reverse flow and cyclone flow, cooling air to the chamber wall, and an alternative fuel supply for converting and/or generating energy.

An Exemplary Energy and/or Mechanical Work Generation System

Figure 12:
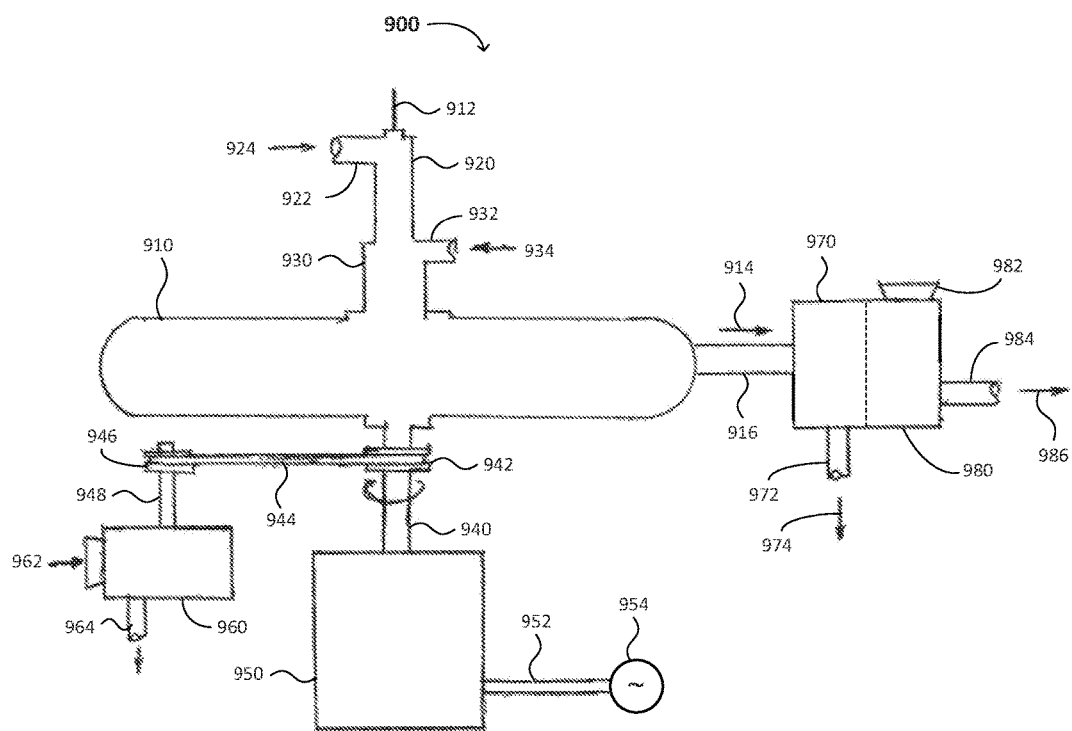
FIG. 12 is a diagram showing an exemplary energy and/or mechanical work generation system according to the present invention.

FIG. 12 is a diagram showing an exemplary energy and/or mechanical work generation system 900 according to the present invention. The system 900 of FIG. 12 generally includes a rotary engine 910, a generator 950, a first compressor 960, a turbine 970, and a second compressor 980. The engine 910 may comprise an exemplary engine as described herein (e.g., engine 100 of FIGS. 2A-B or engine 200 of FIGS. 3A-B). The engine 910 may receive fuel or a fuel-and-air mixture 934 from a fuel supply conduit 930 via fuel supply tube/pipe 932, and compressed air 924 from an oxidant (e.g., air) supply conduit 920 via oxidant supply tube/pipe 922. The housing of the engine 910 is substantially radially symmetrical around a central axis (e.g., rod or shaft) 912. As propulsion vessels or fuel burners (not shown) in the engine 910 burn fuel, they rotate around the central axis 912 and drive a rotating shaft 940, which drives a first wheel or gear 942 on (e.g., attached or affixed to, or integral with, the shaft 940) and provides a rotary force to the generator 950. The generator produces electricity or electrical power 954, which is transferred from the generator 950 along electrical conduit (e.g., wire or cable) 952. The electricity or electrical power 954 can be stored in a battery (not shown), for example.

In turn, the first wheel or gear 942 drives a belt or chain 944 engaged thereto or therewith, and the belt or chain 944 rotates a second wheel or gear 946 to or with which it is also engaged. A number of suitable alternative driving mechanisms for transferring rotary force from the shaft 940 to an engine (e.g., compressor 960) can be envisioned, such as a direct gear-to-gear mechanism, a crankshaft-and-piston system (in which case the shaft 940 is configured as a crankshaft), etc. The second wheel or gear 946 is attached or affixed to, or integral with, a second rotating shaft 948, which provides a rotary force to the first compressor 960. However, any engine that can perform work from rotary force, or otherwise convert the rotary force to a different form of energy (e.g., electricity, heat, linear mechanical energy, etc.) can be used in the system 900 instead of the compressor 960. External air 962 can be drawn into the compressor 960 and distributed to other components in the system 900 (e.g., the oxidant supply conduit 924 and/or the fuel supply subsystem, such as the tube or conduit 412 in FIG. 6A) via compressed air tube or conduit 964.

The engine 910 also provides high-velocity and/or high-pressure exhaust 914 through one or more exhaust vents 916, each of which can be operably connected to a turbine 970. The exhaust 914 drives one or more rotary fans or other rotary objects in the turbine 970 to get additional mechanical work out of the system 900. In the example shown in FIG. 12, the turbine powers a second compressor 980, which draws in external air at inlet 982 and provides compressed air 986 via tube or conduit 984 to other components in the system 900 (e.g., the oxidant supply conduit 924 and/or the fuel supply subsystem, as described herein) or external to the system 900. In one example, the compressor 980 can also transfer heat from the exhaust 914 entering the turbine 970 and provide warm or hot compressed air 986 to the fuel supply subsystem to heat and/or dry the biomass fuel. Also, the turbine 970 can drive other engines (e.g., a second generator) to produce other forms of energy or perform other kinds of mechanical work. The used exhaust 974 leaves the turbine 970 through a vent, tube, pipe or conduit 972. The used exhaust 974 can also be supplied to the fuel supply subsystem to heat and/or dry the biomass fuel.

CONCLUSION/SUMMARY

The present invention provides an engine that advantageously uses a rotational driving force as a motor. As a result, the present engine is more efficient and has less wear and tear. Furthermore, the present engine may advantageously utilize alternative forms of fuel, such as biomass powder. The biomass powder energy conversion and/or generation system and the hybrid turbine technology of the present invention can be adapted to other applications, such as the efficient production of electricity or mechanical drive systems.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. An engine, comprising:
   a) a housing having an inner wall and an outer wall;
   b) a central rotary shaft extending from said housing, said central rotary shaft including a first portion of at least one fuel and air supply channel therein, and said housing and said central rotary shaft being configured to extend said central rotary shaft through either of two opposite sides of the housing;
   c) a rod or cable that is coaxial with the central rotary shaft and that extends through the other of the two opposite sides of the housing;
   d) at least two rotational arms extending from said central rotary shaft, each of said rotational arms having a second portion of said at least one fuel and air supply channel therein, the second portion extending radially from said rotary shaft through the rotational arms and being continuous with and in fluidic communication with the first portion of said at least one fuel and air supply channel;
   e) at least two propulsion vessels, each propulsion vessel (i) connected to a distal end of a corresponding one of the at least two rotational arms and said at least one fuel and air supply channel, and (ii) configured to burn or detonate a fuel supplied by said at least one fuel and air supply channel and rotate around said central rotary shaft; and
   f) at least one exhaust duct extending from said housing.

2. The engine of claim 1, wherein said housing further comprises an insulation layer on said outer wall.

3. The engine of claim 1, wherein said engine further comprises a generator configured to receive rotational force or mechanical energy from said central rotary shaft.

4. The engine of claim 1, wherein said fuel and air supply channel comprises at least two conduits or paths, said at least two conduits or paths having a first conduit or path for supplying said fuel and a second conduit or path for supplying said air.

5. The engine of claim 1, wherein each of said propulsion vessels further comprise an igniter, downstream from an inlet into said propulsion vessel from said fuel and air supply channel.

6. The engine of claim 1, wherein said inner wall comprises openings configured to generate cross flow, reverse flow and/or cyclone flow, creating turbulence inside said housing.

7. The engine of claim 1, wherein said housing and said central rotary shaft are configured to extend said central rotary shaft through either of two opposite sides of said housing.

8. The engine of claim 1, further comprising one or more gears or fans at an end of said coaxial rod or cable.

9. The engine of claim 1, wherein each of said rotational arms and/or each of said propulsion vessels comprises one or more fins thereon.

10. The engine of claim 1, wherein each of the at least two rotational arms comprises at least two propulsion vessels.

11. The engine of claim 1, wherein said at least one exhaust duct comprises a reflector.

12. The engine of claim 1, wherein said at least one exhaust duct comprises two exhaust ducts extending from said housing.

13. A method of converting energy, comprising:
   a) introducing a fuel into a housing through at least a first opening in a fuel and air supply channel having a first portion in a central rotary shaft that extends through the housing, and said housing and said central rotary shaft being configured to extend said central rotary shaft through either of two opposite sides of the housing;
   b) rotating a rod or cable that is coaxial with the central rotary shaft and that extends through the other of the two opposite sides of the housing;
   c) rotating at least two rotational arms extending from the central rotary shaft, each of said rotational arms having a second portion of said at least one fuel and air supply channel therein, said second portion extending radially from said rotary shaft through the rotational arms and being continuous with and in fluidic communication with the first portion of said at least one fuel and air supply channel;
   d) igniting the fuel in a burner or combustion chamber fixed to said fuel and air supply channel, thereby rotating said central rotary shaft; and
   e) exhausting gas(es) through at least one opening in an inner wall of said housing and at least one exhaust vent or port in an outer wall of the housing.

14. The method of claim 13, further comprising directing exhaust from said at least one exhaust vent or port to a turbo unit, rotating at least one fan in said turbo unit using the exhaust, and supplying compressed air to the combustion chamber.

15. The method of claim 13, wherein said housing and said central rotary shaft are configured to extend said central rotary shaft through either of two opposite sides of said housing.

16. The method of claim 13, further comprising rotating one or more gears or fans at an end of said coaxial rod or cable.

17. The method of claim 13, wherein each of said rotational arms and/or each of said propulsion vessels comprises one or more fins thereon.

18. The method of claim 13, wherein each of said at least two rotational arms comprises at least two propulsion vessels.

19. The method of claim 13, further comprising directing the exhaust from said at least one exhaust duct using a reflector.

20. The method of claim 13, wherein said at least one exhaust duct comprises two exhaust ducts extending from said housing.

* * * * *